United States Patent
Baghernezhad et al.

(10) Patent No.: US 11,560,850 B2
(45) Date of Patent: Jan. 24, 2023

(54) DETECTION OF ABNORMAL ENGINE STARTS

(71) Applicant: PRATT & WHITNEY CANADA CORP., Longueuil (CA)

(72) Inventors: Farzad Baghernezhad, Lasalle (CA); Antoine Pierre, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 965 days.

(21) Appl. No.: 16/370,290

(22) Filed: Mar. 29, 2019

(65) Prior Publication Data

US 2020/0309035 A1 Oct. 1, 2020

(51) Int. Cl.
F02C 7/26 (2006.01)

(52) U.S. Cl.
CPC ............ *F02C 7/26* (2013.01); *F05D 2260/80* (2013.01); *F05D 2270/304* (2013.01); *F05D 2270/309* (2013.01)

(58) Field of Classification Search
CPC .... F02C 7/26; F05D 2260/80; F05D 2260/85; F05D 2270/304; F05D 2270/309; G05B 23/0221
See application file for complete search history.

(56) References Cited

U.S. PATENT DOCUMENTS

| | | | |
|---|---|---|---|
| 4,891,971 A * | 1/1990 | Jones | F02C 7/26 73/112.01 |
| 6,505,143 B1 | 1/2003 | Lakshminarasimha et al. | |
| 7,216,489 B2 | 5/2007 | Uluyol et al. | |
| 8,655,571 B2 | 2/2014 | Gelb et al. | |
| 2013/0199204 A1 | 8/2013 | Camhi et al. | |
| 2016/0239756 A1 | 8/2016 | Aggour et al. | |
| 2018/0319510 A1 * | 11/2018 | Danielson | B64D 43/00 |
| 2019/0032560 A1 * | 1/2019 | Fiedler | F02C 7/26 |

FOREIGN PATENT DOCUMENTS

| | | | | |
|---|---|---|---|---|
| EP | 1118920 A1 * | 7/2001 | ......... | G05B 19/4065 |
| EP | 2538034 A2 * | 12/2012 | ........... | F01D 21/003 |
| WO | WO-2015053774 A1 * | 4/2015 | ......... | G05B 23/0229 |

OTHER PUBLICATIONS

Extended European Search Report dated Jun. 22, 2020 in connection with EP application No. 20166832.4.
European Patent Office, Communication purusant to Article 94(3) EPC re: European patent application No. 20166832.4, dated Apr. 29, 2022.

* cited by examiner

*Primary Examiner* — Russell Frejd
(74) *Attorney, Agent, or Firm* — Norton Rose Fulbright Canada LLP (57) ABSTRACT

Methods and systems for detecting an abnormal start of a gas turbine engine are described. Speed data points are sampled from a sensor associated with the engine in accordance with a sampling rate, the speed data points being indicative of a rotational speed of a gas generator of the engine during engine start. The speed data points are continuously stored during the engine start. Previously-obtained speed data points which are older than an abnormal start delay are discarded. An abnormal engine start event is detected by comparing a first one of the stored speed data points with a second one of the stored speed data points, the second one of the stored speed data points obtained before the first one.

18 Claims, 5 Drawing Sheets

FIGURE 5

DETECTION OF ABNORMAL ENGINE STARTS

TECHNICAL FIELD

The application relates generally to engine operation, and more particularly to the detection of abnormal engine starts.

BACKGROUND OF THE ART

In certain circumstances, gas turbine engine ignition can fail, i.e. the engine does not ignite as expected or as desired. There exist various types of engine failures, and it may be of interest to determine the type and/or cause of engine ignition failure. However, accurately detecting engine ignition failure can be a resource-intensive process for automated engine control systems.

As such, there is room for improvement.

SUMMARY

In accordance with a broad aspect, there is provided a method for detecting an abnormal start of a gas turbine engine. Speed data points are sampled from a sensor associated with the engine in accordance with a sampling rate, the speed data points being indicative of a rotational speed of a gas generator of the engine during engine start. The speed data points are continuously stored during the engine start. Previously-obtained speed data points which are older than an abnormal start delay are discarded. An abnormal engine start event is detected by comparing a first one of the stored speed data points with a second one of the stored speed data points, the second one of the stored speed data points obtained before the first one.

In accordance with another broad aspect, there is provided a system for detecting an abnormal start of a gas turbine engine. The system comprises a processing unit and a non-transitory computer-readable medium having stored thereon program instructions. The program instructions are executable by the processing unit for: sampling, in accordance with a sampling rate, speed data points from a sensor associated with the engine, the speed data points indicative of a rotational speed of a gas generator of the engine during engine start; continuously storing the speed data points during the engine start; discarding previously-obtained speed data points older than an abnormal start delay; and detecting an abnormal engine start event by comparing a first one of the stored speed data points with a second one of the stored speed data points, the second one of the stored speed data points obtained before the first one.

DESCRIPTION OF THE DRAWINGS

Reference is now made to the accompanying figures in which.

DETAILED DESCRIPTION

Figure 1:
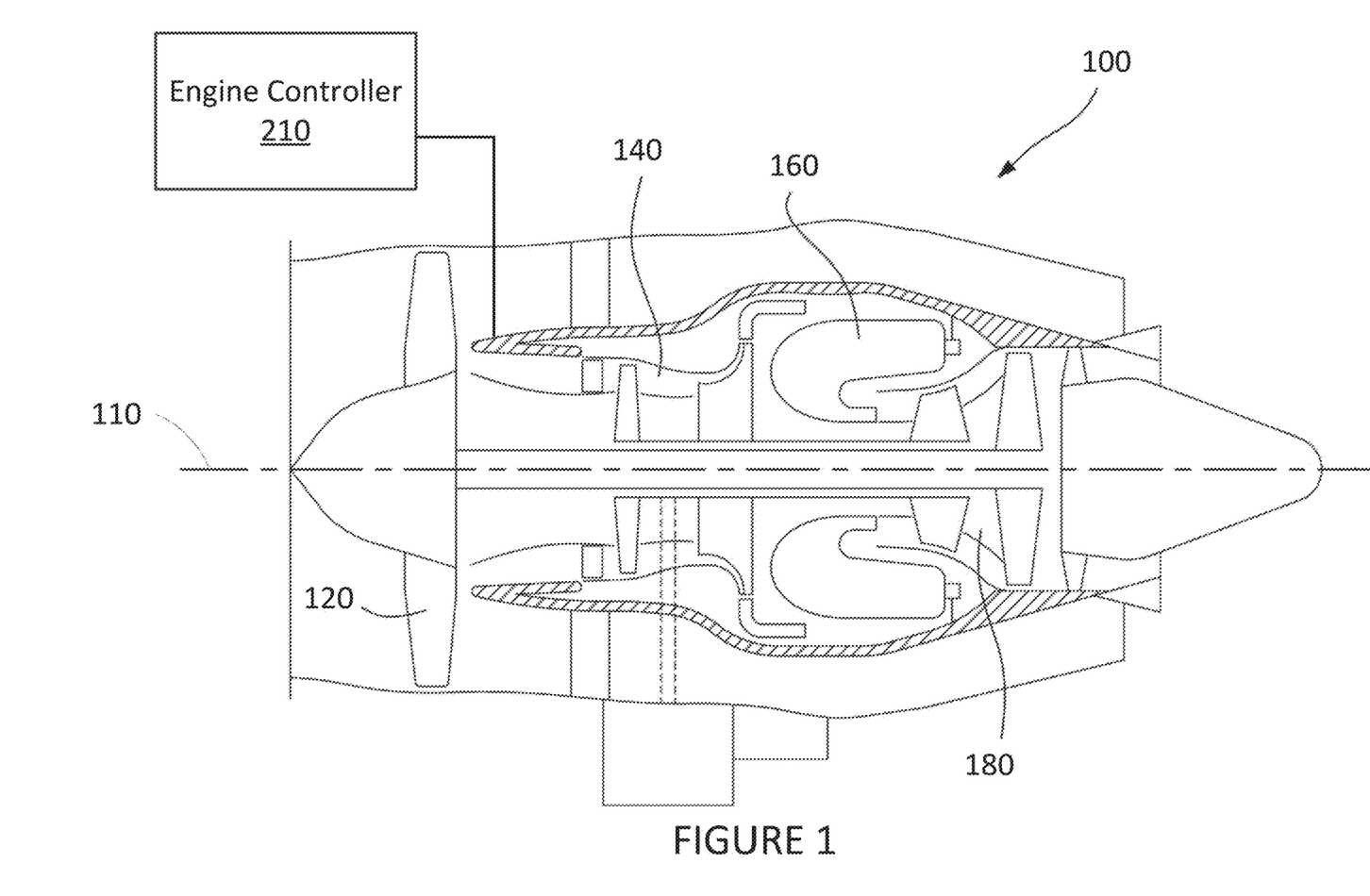
FIG. 1 is a schematic cross-sectional view of an example engine, in accordance with one or more illustrative embodiments.

With reference to FIG. 1, there is illustrated a gas turbine engine 100. Note that while engine 100 is a turbofan engine, the methods and systems described herein may be applicable to turboprop, turboshaft, and other types of gas turbine engines, or combustion engines generally. In addition, the engine 100 may be an auxiliary power unit (APU), an auxiliary power supply (APS), a hybrid engine, or any other suitable type of engine. In addition, although the foregoing discussion relates to a singular engine 100, it should be understood that the techniques described herein can be applied substantially concurrently to multiple engines.

The engine 100 generally comprises in serial flow communication: a fan 120 through which ambient air is propelled, a compressor section 140 for pressurizing the air, a combustor 160 in which the compressed air is mixed with fuel and ignited for generating an annular stream of hot combustion gases, and a turbine section 180 for extracting energy from the combustion gases. Axis 110 defines an axial direction of the engine 100. In some embodiments, a low pressure spool is composed of a low pressure shaft and a low pressure turbine. The low pressure shaft drives the propeller 120. A high pressure spool is composed of a high pressure turbine attached to a high pressure shaft, which is connected to the compressor section 140. It should be noted that other configurations for the engine 100 are also considered.

Control of the operation of the engine 100 can be effected by one or more control systems, for example an engine controller 210. The engine controller 210 can modulate a fuel flow rate provided to the engine 100, the position and/or orientation of variable geometry mechanisms within the engine 100, a bleed level of the engine 100, and the like. In some embodiments, the engine 100 is part of an aircraft or another suitable vehicle. In some other embodiments, the engine 100 is operated in a different setting, for instance an industrial setting.

In order to operate the engine 100, an engine start procedure can be performed to initiate operation of the engine 100. The start procedure can be any suitable type of start procedure. In some embodiments, the start procedure uses a starter engine or electric motor to assist with ignition. In other embodiments, the start procedure consists of turning on igniters for the engine 100, commanding a starter for the engine 100, and initiating fuel flow to a combustion chamber of the engine 100. Other steps can also be included, as appropriate.

In the course of operation, it can occur that the engine 100 experiences an abnormal engine start, in which the start procedure fails to properly start the engine 100. One type of abnormal engine start is a so-called "hung start". A hung start can occur when the engine 100 fails to achieve an idle speed (e.g. in RPM) despite engine light off occurring. For example, a starter is used to rotate the engine to a predetermined speed before feeding fuel to the engine and performing light off. In the case of a hung start, the fuel will ignite following light off, but the engine will not reach idle speed. One cause of a hung start can be a weak starter. Other types of abnormal engine starts are also considered.

Figure 2:
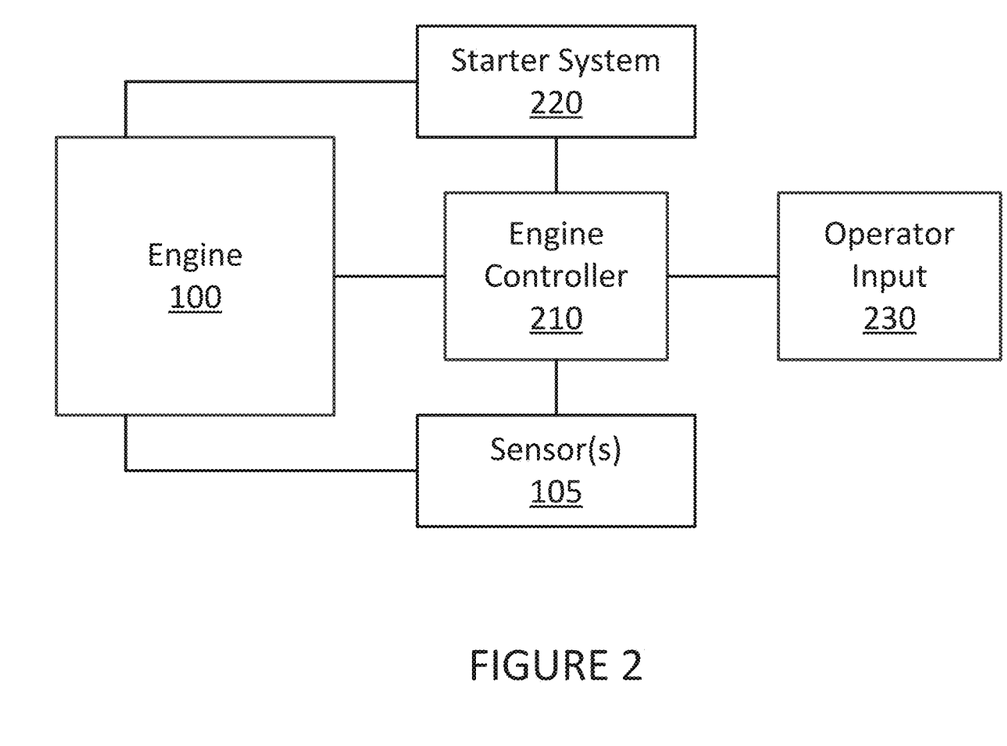
FIG. 2 is a block diagram of an example system for detecting abnormal engine starts, in accordance with one or more illustrative embodiments.

With reference to FIG. 2, the engine controller 210 implements a system for detecting abnormal engine starts, for instance abnormal starts of the engine 100. In some embodiments, the engine 100 is part of an aircraft, which also includes the engine controller 210, one or more sensors 105, a starter system 220, and operator input 230. It should be noted, however, that the foregoing discussion is also applicable to embodiments in which the engine 100 is operated in other contexts. The starter system 220 is coupled to the engine 100 for starting the engine 100, for instance when the aircraft is on the ground, or at low power during flight. In some embodiments, the starter system 220 includes a starter engine, for instance an electric motor. The operator input 230 can include buttons, switches, dials, or other discrete-type input mechanisms, touchscreens or other electronic input devices, and the like. For example, the operator input 230 includes an activation switch for the engine 100 which sets a commanded operating state for the engine 100. The commanded operating state can be an "off" state, an "on" state, a "start" state, and the like, each associated with respective positions for the activation switch.

The engine controller 210 can be communicatively coupled to the engine 100 for, inter alia, controlling operation thereof and for detecting the occurrence of abnormal engine starts. The engine controller 210 can also be coupled to the starter system 220 for controlling operation thereof, for instance to command the starter system 220 to initiate a start procedure for the engine 100. The engine controller 210 can further be coupled to the operator input 230 to obtain various commands from an operator of the engine 100 and/or the aircraft. For example, the operator input 230 can be used to instruct the engine controller 210 to initiate a start procedure for the engine 100.

In some embodiments, the sensors 105 include a speed sensor which reports data indicative of a speed of the engine 100. For example, the speed sensor reports data indicative of the speed of a gas generator of the engine 100, of a main shaft of the engine 100, or of any other suitable component within the engine 100. The speed sensor can be any suitable type of sensor, and is configured for collecting data during various phases of operation of the engine 100, including during engine start. For example, the speed sensor consists of a toothed wheel which rotates with a shaft or other rotatable element of the engine 100 and a detector for sensing the presence or absence of the teeth of the wheel. The frequency of detection of the teeth of the wheel can then be used to measure the speed of the engine 100. Other examples of speed sensors are also considered. In addition, in some embodiments the sensors 105 can include other types of sensors.

In order to detect the occurrence of an abnormal start of the engine 100, the engine controller 210 is configured for obtaining and analyzing data points obtained from the sensors 105 during, inter alia, engine start. In the case of a hung start of the engine 100, the engine controller 210 can compare two readings of the speed of the engine 100 which are separated by a predetermined time delay. The time delay can be any suitable value, and in some cases is established based on regulatory requirements or other guidelines. For example, the engine speed at a current time (e.g. t=0 sec) can be compared with the engine speed at a previous time (e.g. t=−5 sec) If the difference between the two engine speed values is less than a predetermined threshold, it can be determined that the engine 100 experienced an abnormal engine start event. In some cases, the engine controller 210 can determine that the engine has experienced an abnormal engine start when multiple abnormal engine start events occur in succession, or within a predetermined time period.

Certain existing approaches to detecting abnormal engine starts acquire substantially all data reported by the sensors 105. Described herein is an alternative approach which may, in certain embodiments, assist in reducing requirements associated with computing power and/or storage space for systems which detect abnormal engine starts. For example, changes in engine speed when starting the engine 100 can be much lower than the reporting rate of the sensors 105. As a result, the sensors 105 report data at a reporting rate higher than necessary for evaluating changes in the speed of the engine 100. In addition, data obtained from the sensors 105 can be discarded once used for evaluating abnormal engine starts. This can lead to reduced storage requirements for data obtained from the sensors 105. Moreover, abnormal engine starts can manifest differently in different engines, and the use of a flexible sampling rate for data obtained from the sensors 105 can assist in tailoring techniques for detecting abnormal engine starts.

In accordance therewith, it is considered that the engine controller 210 can sample the data produced by the sensors 105, for instance a speed sensor, and for instance during engine start. The engine controller 210 can be instructed to sample the data produced by the sensors 105 at a particular sampling rate, which can be established based on regulatory requirements or other guidelines, or can be varied based on user input, for instance via the operator input 230. In some embodiments, the sampling rate of the engine controller 210 can be lower than the sampling rate of the sensors 105. For example, the engine controller 210 can sample the data from the sensors 105 at half the reporting rate of the sensors 105, at one-third the rate, at one-tenth the rate, or the like.

In some embodiments, the engine controller 210 can sample the data reported by the sensors 105 over a sampling window when collecting data points. In one example, the sampling rate of the engine controller 210 is one-third the reporting rate of the sensors 105, and the sampling window is a length of time in which the sensors 105 produce three data points. In this fashion, the engine controller 210 will receive three data points within the sampling window, and then assigns as the current data point a value based on the three data points received from the sensors 105.

When sampling data from the sensors 105 over a sampling window, the engine controller 210 can use the average of all data points as the sampled data point, a maximum or minimum data point, or any other suitable approach. In one example, the engine controller 210 receives multiple data points and discards the data points with the highest and lowest value. The engine controller 210 then assigns as the sampled data point the remaining data point, or the average of the remaining data points; alternatively, the engine controller 210 can continue discarding the highest and lowest data points until only one remains, and assign that data point as the sampled data point. Other approaches are also considered.

In addition, since the assessment of an abnormal engine start event is based on comparing sampled data points which are separated in time by a predetermined time delay, sampled data points which are older than the duration of the predetermined time delay can be discarded. In some embodiments, the sampled data points are stored in a memory, which can be any suitable type of computer-readable memory and have any suitable size. In some embodiments, the engine controller 210 is configured for discarding from the memory sampled data points which are older than the predetermined time delay. The sampled data points older than the predetermined delay can be identified in any suitable fashion, for instance by associating each of the sampled data points with a timestamp. Other approaches are also considered.

In one example, the memory is sized to accommodate a predetermined number of data points equivalent to the product of the predetermined time delay and the predetermined sampling rate. For instance, if the predetermined sampling rate is 25 samples per second, and the predetermined time delay is 10 seconds, the memory is sized to accommodate 250 sampled data points. In this example, when the engine controller 210 samples a new data point, the new data point is stored in the memory, and the oldest data point (which is now older than the predetermined time delay) is discarded from the memory. In some cases, the new data point may overwrite the oldest data point. In other cases, the values in the memory are shifted down and the new data point is stored in an empty memory cell. Other approaches are also considered.

In one example of operation, the engine controller 210 samples the sensors 105, at a predetermined sampling rate, to obtain speed data points during engine start. Each of the speed data points is indicative of a speed of the engine 100 at a particular moment in time, for example a rotational speed of a gas generator of the engine 100, of a main shaft of the engine 100, or of any other suitable component of the engine 100. The speed data points are stored, for instance in a computer-readable memory of suitable size and type. As new speed data points are obtained, previously-obtained speed data points which are older than the predetermined time delay are discarded, for instance to make room for the newly-obtained speed data points. The engine controller 210 can detect the occurrence of abnormal start events by comparing speed data points which were obtained at different times. For instance, speed data points separated in time by the predetermined time delay are compared.

Figure 3:
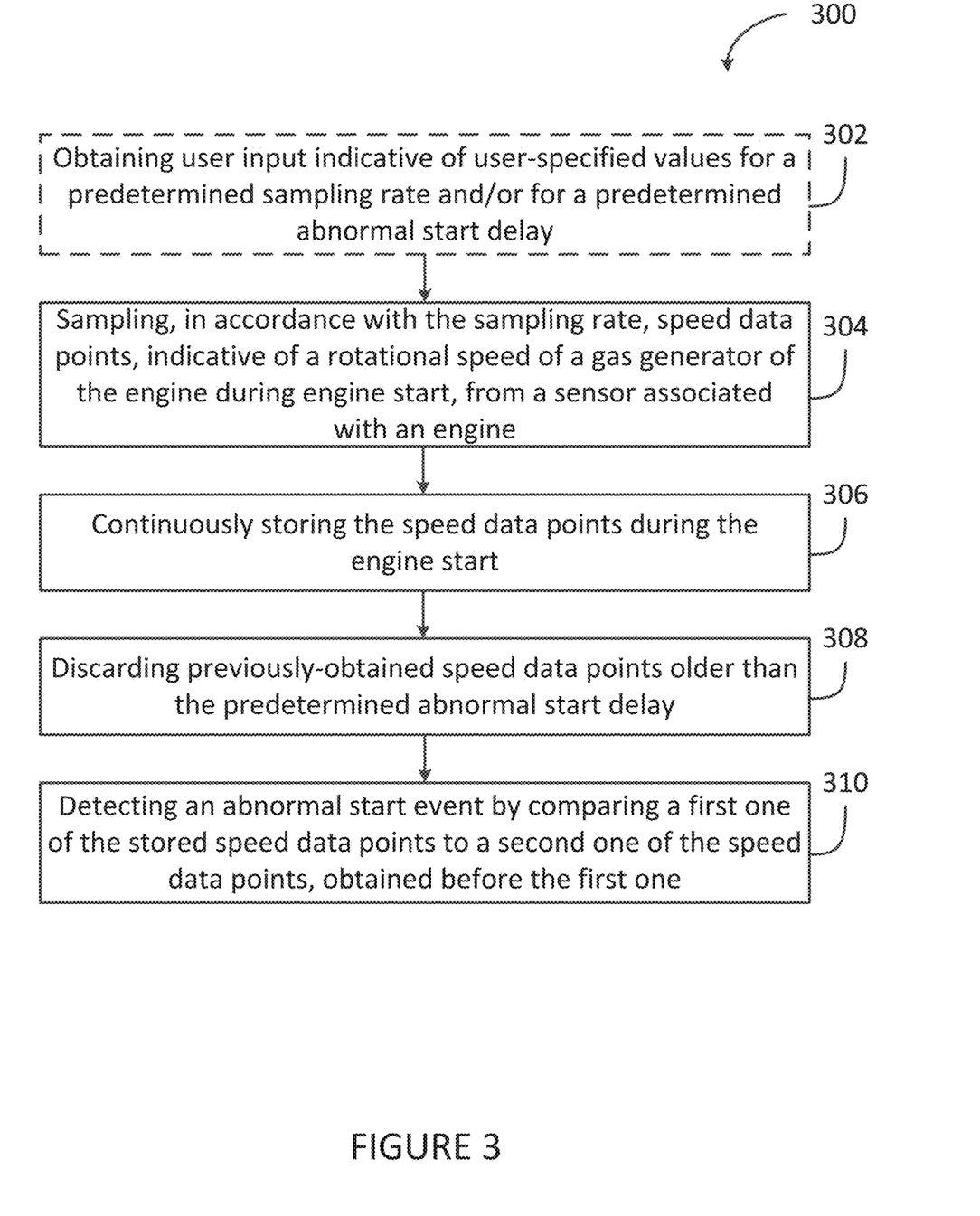
FIG. 3 is a flowchart of an example method for detecting abnormal engine starts, in accordance with one or more illustrative embodiments.

With reference to FIG. 3, there is shown a method 300 for detecting an abnormal start of an engine, for example the engine 100. Optionally, at step 302, user input indicative of user-specified values for a predetermined sampling rate and/or for a predetermined abnormal start delay. The user input can be obtained through any suitable input means. In some embodiments, the user input is provided when the engine controller 210 is programmed, or during an initialization of the engine controller 210. Other approaches are also considered: for instance, the user input can be provided by maintenance crew when performing maintenance of the engine 100.

At step 304, speed data points are sampled from a sensor associated with the engine 100, for example one or more of the sensors 105. The sensors 105 can be sampled at any suitable sampling rate, which can be lower than the reporting rate of the sensors 105. In some embodiments, the sampling rate is established based on regulatory requirements or other guidelines. In some other embodiments, the sampling rate is defined by a user, for example an operator of the engine 100, a maintenance authority for the engine 100, or any other suitable user. The speed data points sampled from the sensor can be indicative of a rotational speed of an element within the engine 100, for example a gas generator, a main shaft, or any other suitable element.

At step 306, the speed data points are continuously stored, for example in a memory or other storage device, during the engine start. At step 308, previously-obtained speed data points which are older than a predetermined abnormal start delay are discarded, for instance from the memory or other storage device. It should be noted that in some embodiments, steps 306 and 308 can be performed substantially simultaneously, or otherwise together: for instance, the discarding of a previously-obtained speed data point can occur due to a newly-obtained speed data point being stored in the memory location where the previously-obtained speed data point is stored. Put differently, a newly-obtained speed data point can overwrite a previously-obtained speed data point.

At step 310, an abnormal start event for the engine 100 can be detected by comparing a first one of the stored speed data points to a second one of the stored speed data points, which was obtained before the first one. For example, the first and second ones of the stored speed data points can be obtained a predetermined delay apart, which can be equal to the predetermined abnormal start delay. In some embodiments, the abnormal start event can be detected when a value of the first one of the stored speed data points is not greater than a value of the second one beyond a predetermined threshold. Put differently, an abnormal start event can be detected based on comparing the difference between the values of the first and second ones of the stored speed data points to a predetermined threshold. When the difference is greater than the threshold, this indicates that the engine 100 is accelerating appropriately, and that the engine 100 has not experienced a hung start; when the difference is less than the threshold, this indicates that the engine 100 may not be accelerating appropriately, and that the engine 100 may be experiencing a hung start or some other abnormal start event.

In some embodiments, a hung start is detected once a single abnormal start event is detected. That is to say, a single abnormal start event is sufficient for concluding that the engine 100 has experienced a hung start. In other embodiments, a hung start is detected after a predetermined number of abnormal start events. For example, following detection of a first abnormal start event at step 310, the method 300 can return to some previous step, for instance step 304, at which a new speed data point is sampled. Steps 306 to 310 are then repeated, and a subsequent abnormal start event can be detected if the difference between subsequent first and second speed data points is less than the aforementioned threshold. Once a predetermined number of subsequent abnormal start events are detected, or a predetermined number within a specific interval, a hung start of the engine 100 is detected. Other approaches are also considered.

When an abnormal start event has been detected, a relevant authority can be alerted. For example, an operator of the engine 100, which can be a pilot of the aircraft, can be alerted that the engine 100 has experienced an abnormal start, for instance via one or more elements of the operator input 230. In some cases, a maintenance provider for the engine 100 and/or the aircraft can also be alerted. Other approaches are also considered.

Figure 4:
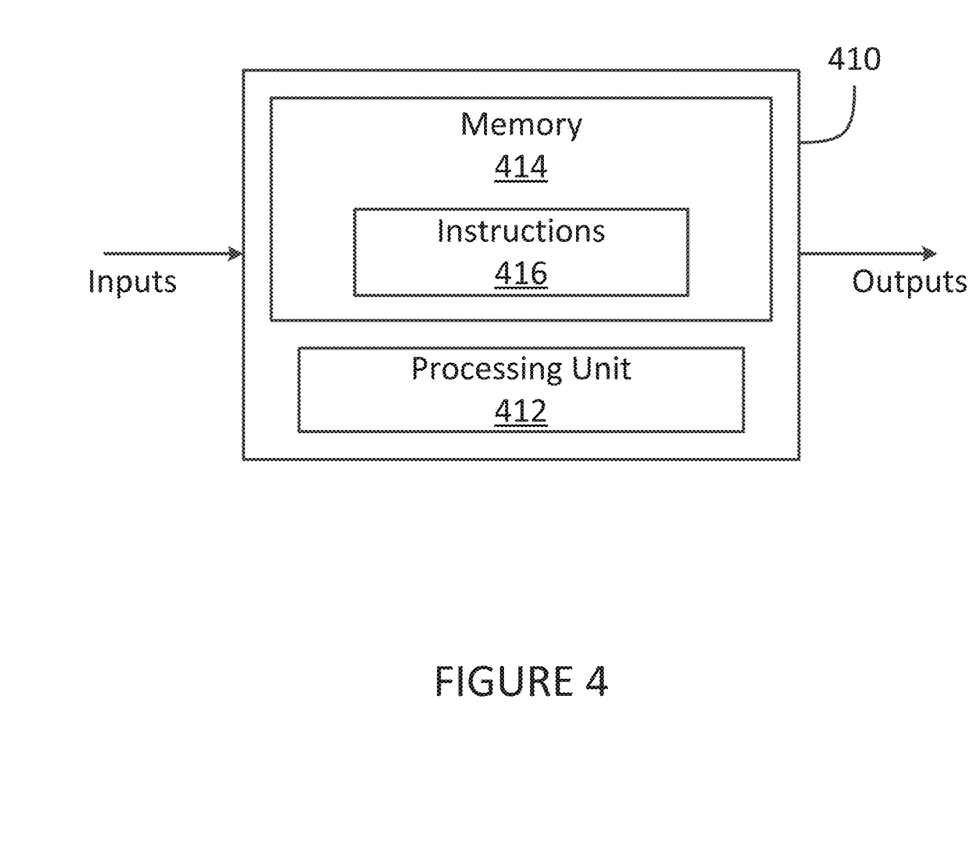
FIG. 4 is block diagram of an example computing device for implementing a portion of the functionality of the system of FIG. 2, in accordance with one or more illustrative embodiments.

With reference to FIG. 4, the method of FIG. 3 may be implemented by a computing device 410 as an embodiment of the engine controller 210. The computing device 410 comprises a processing unit 412 and a memory 414 which has stored therein computer-executable instructions 416. The processing unit 412 may comprise any suitable devices configured to implement the functionality of the engine controller 210 such that instructions 416, when executed by the computing device 410 or other programmable apparatus, may cause the functions/acts/steps performed by the engine controller 210 as part of the method 300 and as described herein to be executed. The processing unit 412 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, custom-designed analog and/or digital circuits, or any combination thereof.

The memory 414 may comprise any suitable known or other machine-readable storage medium. The memory 414 may comprise non-transitory computer readable storage medium, for example, but not limited to, an electronic, magnetic, optical, electromagnetic, infrared, or semiconductor system, apparatus, or device, or any suitable combination of the foregoing. The memory 414 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 414 may comprise any storage means (e.g., devices) suitable for retrievably storing machine-readable instructions 416 executable by processing unit 412.

It should be noted that the computing device 410 may be implemented as part of a FADEC or other similar device, including electronic engine control (EEC), engine control unit (EUC), engine electronic control system (EECS), and the like. In addition, it should be noted that the techniques described herein can be performed by the engine controller 210 substantially in real-time.

It should also be noted that the memory 414 can serve to store the speed data points, or any other sensor data obtained from the sensors 105 by the engine controller 210. In some embodiments, the memory 414 can include multiple memory units, or can be subdivided into partitions or subsections, and each partition or subsection can be assigned to a different task, including storing the speed data points and/or other sensor data, as appropriate.

Figure 5:
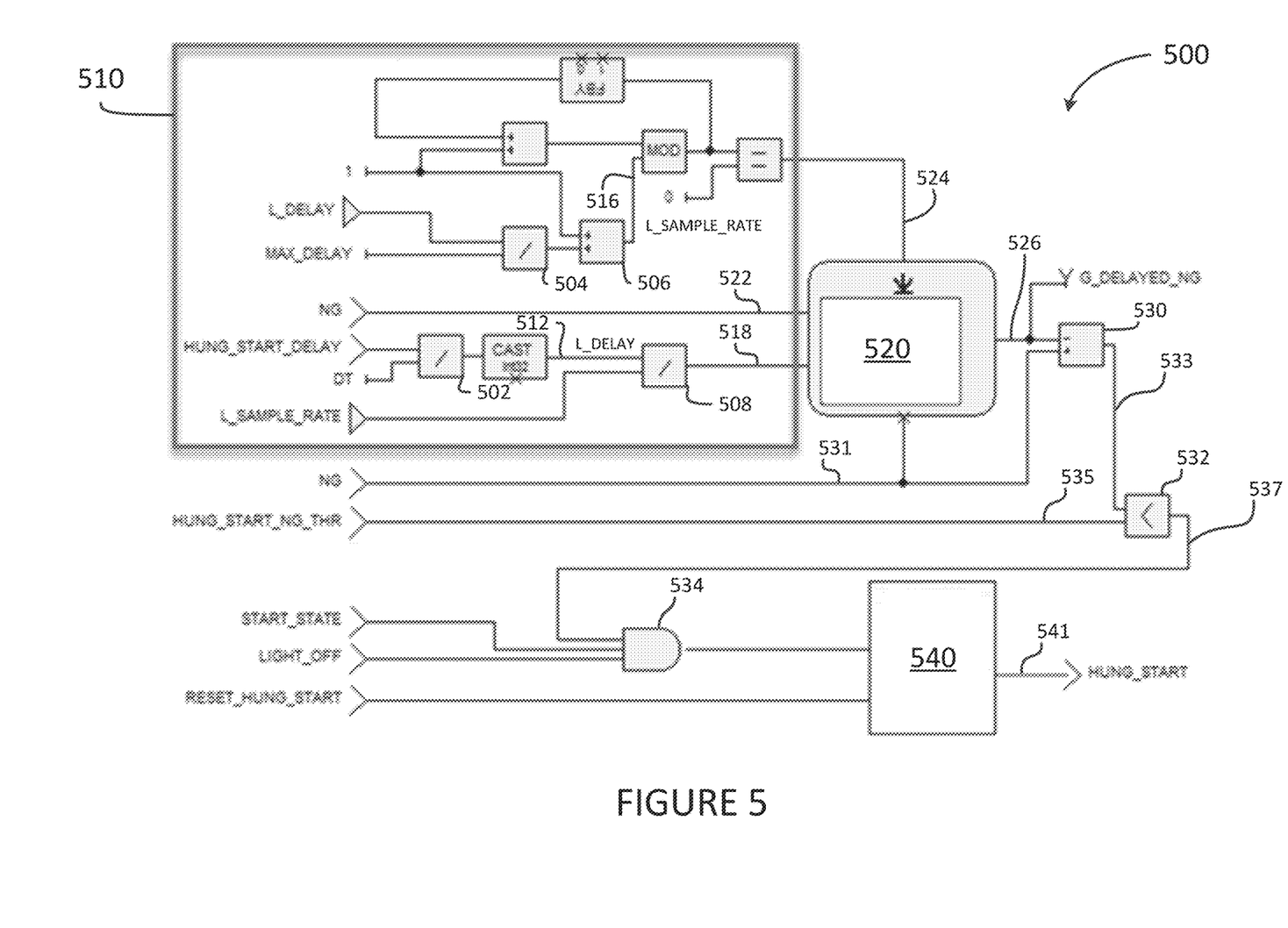
FIG. 5 is a block diagram of an example implementation of a system for detecting abnormal engine starts, in accordance with one or more illustrative embodiments.

With reference to FIG. 5, there is shown an example embodiment of an algorithm 500 for detecting an abnormal start of an engine, for instance the engine 100. A sampling mechanism is illustrated at 510. The sampling mechanism 510 receives a HUNG_START_DELAY input, which indicates a duration (e.g. in seconds) for the abnormal start delay, and a DT input, which is the system clock. The HUNG_START_DELAY input is divided by the DT input at divider element 502, and then cast to an integer, to produce the L_DELAY value, which is output on line 512. The L_DELAY converts the HUNG_START_DELAY value, which is a measure of time, into a count of sampling cycles.

Divider element 504 divides the L_DELAY value by a MAX_DELAY input. MAX_DELAY is indicative of a maximum number of speed data points which can be stored at any given time. In some embodiments, the MAX_DELAY input is based on the size of a memory, or of a partition or portion of a memory, allocated for detecting abnormal engine starts. The output of divider element 504 is a first attempt at producing the rate at which the sensor producing the speed data points will be sampled. In some cases, the division of the L_DELAY value by the MAX_DELAY value does not produce a whole number. Therefore, for robustness, adder element 506 adds the value '1' to the value from divider element 504, which produces the value L_SAMPLE_RATE on line 516. The value L_SAMPLE_RATE is indicative of the sampling rate—that is to say the rate at which the sensors 105 are to be sampled. The L_SAMPLE_RATE value can express the sampling rate to indicate that the sensors 105 should be sampled once every number of reporting cycles for the sensors 105. For example, if the L_SAMPLE_RATE value is '3', then the sampling rate is set at once every 3 reporting cycles—put differently, the sensors 105 are sampled once every three speed data points reported by the sensors 105. Divider element 508 divides the L_DELAY value by the L_SAMPLE_RATE value to produce, on line 518, a value indicative of the number of speed data points to be obtained.

Delay element 520 serves to store obtained data speed points. The delay element 520 receives, on line 522, an NG input, which is indicative of the speed of the engine 100, as reported by the sensors 105, and receives the number of values to be stored on line 518. The sampling rate is provided to the delay element 520 via line 524 to indicate times at which the delay element 520 stores the obtained data speed points. In some embodiments, the delay element 520 incorporates a memory, a buffer, or similar device.

In order to detect abnormal engine start events, the delay element 520 outputs, on line 526, a previously-obtained data speed point, which was obtained a number of seconds prior equivalent to the HUNG_START_DELAY value. Delay element 520 uses a fixed size memory to store the speed data points. The number of stored speed data points, and the sampling rate (L_SAMPLE_RATE) could be changed based on the HUNG_START_DELAY input; the size of the delay element 520 can be fixed. Subtractor element 530 receives the current engine speed via an NG input on line 531, and the previously-obtained speed data point via line 562. The subtractor element 530 outputs the difference between the values on lines 526 and 531 on line 533, which is then provided to comparator element 532. The comparator element 532 obtains, on line 535, a HUNG_START_NG_THR input, which is indicative of a threshold for the difference between the current and previous data speed point values.

The comparator element 532 produces, on line 537, a '1' (or TRUE) value when the value on line 533 is greater than the HUNG_START_NG_THR input, and a '0' (or FALSE) value when the value on line 533 is less than the HUNG_START_NG_THR input. Put differently, the comparator element returns TRUE when the difference between the current and previous data speed point values is greater than the threshold, and FALSE when the difference is less than the threshold.

The output of the comparator element, on line 537, is provided to AND element 534. The AND element 534 also obtains a START_STATE input, which indicates whether a start procedure for the engine 100 is in process, and a LIGHT_OFF input, which indicates whether the light off portion of the start procedure has been accomplished. The AND element 534 performs an AND operation using the START_STATE input, the LIGHT_OFF input, and the value on line 537. In this fashion, the AND element 534 produces a TRUE output when an engine start procedure is in process, engine light off has occurred, and the difference between the values of current and previous data speed points are below the HUNG_START_NG_THR input. If any of the inputs to the AND element 534 are FALSE, the AND element 534 outputs FALSE.

The output of the AND element 534 is provided to a hung start detector 540, which can raise a HUNG_START output on line 541 in response to receiving a TRUE value from the AND element 534. It should be noted that the embodiment of the algorithm 500 illustrated in FIG. 5 is one example implementation and that variants, as well as other implementations, are also considered.

The above description is meant to be exemplary only, and one skilled in the art will recognize that changes may be made to the embodiments described without departing from the scope of the present disclosure. Still other modifications which fall within the scope of the present disclosure will be apparent to those skilled in the art, in light of a review of this disclosure.

Various aspects of the systems and methods described herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be apparent to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A method for detecting an abnormal start of a gas turbine engine, comprising:
    performing an engine start procedure to initiate operation of the gas turbine engine;
    sampling, in accordance with a sampling rate, speed data points from a sensor associated with the gas turbine engine, the speed data points indicative of a rotational speed of a gas generator of the gas turbine engine during the engine start procedure;
    continuously storing the speed data points during the engine start procedure;
    discarding previously-obtained speed data points older than an abnormal start delay;
    detecting an abnormal engine start event by comparing a first one of the stored speed data points with a second one of the stored speed data points, the second one of the stored speed data points obtained before the first one: and
    generating an output indicative of the abnormal engine start event.

2. The method of claim 1, further comprising detecting a plurality of the abnormal start events based on the stored speed data point, wherein the abnormal start of the gas turbine engine is detected based on an occurrence of the plurality of the abnormal start events.

3. The method of claim 1, wherein sampling the sensor to obtain the speed data points comprises sampling data produced by the sensor at the sampling rate which is less than a reporting rate of the sensor.

4. The method of claim 3, wherein sampling the data produced by the sensor comprises assigning, for each of the speed data points, one of a maximum value, a minimum value, and an average value of the data produced by the sensor over a sampling period.

5. The method of claim 1, wherein the second one of the speed data points is obtained a period of time corresponding to the abnormal start delay before the first one of the speed data points.

6. The method of claim 1, further comprising obtaining user input indicative of a user-specified value for the abnormal start delay.

7. The method of claim 6, wherein the sampling rate is obtained by dividing the abnormal start delay by a maximum number of speed data points to be stored.

8. The method of claim 7, wherein the maximum number of speed data points to be stored is obtained by dividing the abnormal start delay by a reporting rate of the sensor.

9. The method of claim 1, wherein the sampling rate and the abnormal start delay are selected based on regulatory requirements associated with the gas turbine engine.

10. A system for detecting an abnormal start of a gas turbine engine, comprising:
    a processing unit; and
    a non-transitory computer-readable medium having stored thereon program instructions executable by the processing unit for:
        commanding an engine start procedure to initiate operation of the gas turbine engine;
        sampling, in accordance with a sampling rate, speed data points from a sensor associated with the gas turbine engine, the speed data points indicative of a rotational speed of a gas generator of the gas turbine engine during the engine start procedure;
        continuously storing the speed data points during the engine start procedure;
        discarding previously-obtained speed data points older than an abnormal start delay;
        detecting an abnormal engine start event by comparing a first one of the stored speed data points with a second one of the stored speed data points, the second one of the stored speed data points obtained before the first one; and
        generating an output indicative of the abnormal engine start event.

11. The system of claim 10, wherein the program instructions are further executable for detecting a plurality of the abnormal start events based on the stored speed data point, wherein the abnormal start of the gas turbine engine is detected based on an occurrence of the plurality of the abnormal start events.

12. The system of claim 10, wherein sampling the sensor to obtain the speed data points comprises sampling data produced by the sensor at the sampling rate which is less than a reporting rate of the sensor.

13. The system of claim 12, wherein sampling the data produced by the sensor comprises assigning, for each of the speed data points, one of a maximum value, a minimum value, and an average value of the data produced by the sensor over a sampling period.

14. The system of claim 10, wherein the second one of the speed data points is obtained a period of time corresponding to the abnormal start delay before the first one of the speed data points.

15. The system of claim 10, wherein the program instructions are further executable for obtaining user input indicative of a user-specified value for the abnormal start delay.

16. The system of claim 15, wherein the sampling rate is obtained by dividing the abnormal start delay by a maximum number of speed data points to be stored.

17. The system of claim 16, wherein the maximum number of speed data points to be stored is obtained by dividing the abnormal start delay by a reporting rate of the sensor.

18. The system of claim 10, wherein the sampling rate and the abnormal start delay are selected based on regulatory requirements associated with the gas turbine engine.

* * * * *